3,354,231
CATALYSTS FOR PRODUCTION OF 1-NAPHTHOL
Arthur L. Maloy, South Charleston, and Robert W. Cunningham, St. Albans, W. Va., assignors to Union Carbide Corporation, a corporation of New York
No Drawing. Filed Sept. 11, 1963, Ser. No. 308,092
4 Claims. (Cl. 260—621)

This invention relates to improved nickel-containing catalyst compositions. More particularly, this invention relates to improved nickel-containing catalysts having utility in hydrogenation and dehydrogenation reactions. In another, and still more particular aspect, this invention relates to improved nickel-containing catalysts for the dehydrogenation of mixtures of 1,2,3,4-tetrahydro-1-naphthol and 1,2,3,4-tetrahydronaphthalene-1-one to 1-naphthol.

In U.S. Patent 2,588,359, there are disclosed nickel catalysts having particular utility in hydrogenation and dehydrogenation reactions. These catalysts, in addition to nickel, contain, based on the weight of the nickel, from 15 to 40 weight percent copper, from 0.5 to 4 weight percent chromium in the form of an oxide, and from 0.3 up to 2.0 weight percent of one or more alkali metal sulfates. It was believed that all these constituents were essential to the efficient operation of the hydrogenation or dehydrogenation process. More recently it was discovered that the stability of these catalysts could be increased by increasing the sulfur content of the catalyst so that the alkali metals were present in the form of their sulfates or pyrosulfates.

Although these catalysts were generally satisfactory, it was found that, when reactivated, they were often less efficient as catalysts and, in some instances, had very little catalytic activity. It has been unexpectedly and surprisingly found by this invention, however, that if the copper is not present in the catalyst it is readily reactivated and, after reactivation, may have improved efficiencies over the initial catalysts. In addition, the catalyst of this invention is capable of catalyzing reactions at higher feed rates with no loss in yield, conversion or efficiency when compared with the copper-containing catalysts.

The catalysts of this invention consist essentially of nickel and, based on the weight of the nickel, from 0.5 to 4 percent chromium, mostly in the form of its oxide; from 1 to 3 weight percent of an alkali metal selected from the group consisting of sodium or potassium or mixtures thereof, a portion of said alkali metal being in the form of its sulfate; and sulfur in a molar ratio of said alkali metal to sulfur of from 1.2 to 8, said sulfur being in the form of a sulfate of said alkali metal. When the molar ratio of alkali metal to sulfur is at least 2, the sulfur will be in the form of an alkali metal sulfate. When this ratio is less than 2, the sulfur will be present in the form of an alkali metal sulfate and/or an alkali metal pyrosulfate.

In addition, platinum metals such as platinum or palladium, which are commonly employed as promoters for nickel catalysts, can be present if desired, but are not necessary.

It is essential, however, that the catalyst contain substantially no copper, i.e., that the copper content of the caalyst be less than 0.1 weight percent, based on the weight of the nickel.

The preferred catalyst consists of nickel and, based on the weight of the nickel, from 1 to 2 weight percent chromium, mostly, in the form of its oxide, from 1 to 3 weight percent sodium, a portion of which is in the form of its sulfate salt, from 0 to 0.4 weight percent of potassium, a portion of which is in the form of its sulfate salt, and sulfur in the form of an alkali metal sulfate, wherein the molar ratio of the alkali metal to the sulfur is from 2 to 4.

The catalysts are employed in the form of a support material impregnated with the catalyst components in the desired ratio. The catalyst support can be any material which is inert, both chemically and catalytically, is porous and which possesses a reasonable degree of physical strength, such as ceramically bonded silica, alumina and the like. Some of the commercially available support materials contain small amounts of alkali metal, particularly potassium. In such cases the amount of the alkali metal in the support material should be included in determining the proportions of the catalyst components.

The catalysts are prepared by impregnating the support material with the metals in the desired proportions. This is conveniently effected by immersing the support material in an aqueous solution of water soluble salts of the metals in suitable proportions. The salts should be substantially free of sulfur compounds such as mercaptans and sulfides or unknown contaminants, which may adversely affect the activity of the catalyst product. Pure nickel is obtained by dissolving slab electrolytic nickel in nitric acid to produce the corresponding nitrate. Chromium is conveniently obtained as chromium acetate. The alkali metals can be added as sulfates or nitrates. If nitrates are employed, sulfuric acid should be added to the aqueous solution to convert the nitrates to sulfates.

After impregnation of the support material with the aqueous solution, the resulting mixture is evaporated to dryness and then roasted at a temperature of about 375 to 400° C. for a period of time sufficient to decompose the nitrates, as determined by the cessation of the evolution of nitrogen oxides. The impregnation and roasting can be repeated one or more times as desired. In general, it is preferred that the catalyst contain from about 6 to about 18, preferably from about 12 to about 14, weight percent nickel based on the weight of the entire catalyst.

After the final roasting to drive off the nitrogen oxides the catalyst is activated by an oxidation-reduction cycle, wherein the catalyst is oxidized by heating in air at about 375° C. for about 2 hours; and then reduced by heating at about 375° C. in a hydrogen atmosphere for up to about 8 hours or more. This cycle can be repeated one or more times as desired.

The following examples are illustrative of this invention. The dehydrogenation processes shown in the examples illustrate the use of the catalyst of this invention in a two-stage conversion of a mixture of 1,2,3,4-tetrahydronaphthalene-1-one and 1,2,3,4-tetrahydro-1-naphthol to 1-naphthol. In this process, the first stage is conducted under mild conditions wherein the 1,2,3,4-tetrahydro-1-naphthol is converted to 1,2,3,4-tetrahydronaphthalene-1-one and the yield of 1-naphthol is not maximized, and the second stage is conducted at higher temperatures to convert the 1,2,3,4-tetrahydronaphthalene-1-one to 1-naphthol. This sequence has been found necessary to the efficient operation of the dehydrogenation, for if the initial 1,2,3,4-tetrahydronaphthalene-1-one - 1,2,3,4 - tetrahydro-1-naphthol mixture is dehydrogenated at temperatures sufficient to produce a maximum yield of 1-naphthol, the 1,2,3,4-tetrahydro-1-naphthol, instead of dehydrogenating to 1,2,3,4-tetrahydronaphthalene-1-one, dehydrates to form dihydronaphthalene. In the examples the yield, conversion and efficiencies were determined by the following equations:

$$\text{Percent yield} = \left[\frac{\text{1-naphthol out} - \text{1-naphthol in}}{\text{1,2,3,4-tetrahydronaphthalene-1-one} + \text{1,2,3,4-tetrahydro-1-naphthol in}}\right] \times 100$$

$$\text{Percent conversion} = \left[\frac{(\text{1,2,3,4-tetrahydronaphthalene-1-one} + \text{1,2,3,4-tetrahydro-1-naphthol in}) - (\text{1,2,3,4-tetrahydronaphthalene-1-one} + \text{1,2,3,4-tetrahydro-1-naphthol out})}{\text{1,2,3,4-tetrahydronaphthalene-1-one} + \text{1,2,3,4-tetrahydro-1-naphthol in}}\right] \times 100$$

$$\text{Percent efficiency} = \left[\frac{\text{naphthol out} - \text{naphthol in}}{(\text{1,2,3,4-tetrahydro-1-naphthol} + \text{1,2,3,4-tetrahydronaphthalene-1-one in}) - (\text{1,2,3,4-tetrahydro-1-naphthol} + \text{1,2,3,4-tetrahydronaphthalene-1-one out})}\right] \times 100$$

*Example 1*

One hundred forty grams of powdered nickel were dissolved in a stoichiometric excess of 70 percent nitric acid. The solution was heated to boiling and 1.30 grams of an aqueous solution of chromium acetate (20 weight percent calculated as $Cr_2O_3$), 10.4 grams of sodium nitrate dissolved in water, and 5 grams of concentrated sulfuric acid were added. About one-third of the resulting solution was thoroughly admixed with 847 grams of 2 x 4 mesh Aloxite (Carborundum brand, porous, ceramically bonded alumina pellets containing small amounts of potassium) until the solids appeared to be dry by visual observation. The impregnated pellets were then heated in a forced-air oven at 375–380° C. for 2 hours. Employing similar procedures, the remaining solution was deposited in two equal portions on the impregnated pellets.

The impregnated pellets were then charged to a 1.5 x 60-inch stainless steel, Dowtherm-heated converter and heated to 375±2° C. Air was passed through the catalyst for 2 hours at a rate of 16 liters of air per hour to oxidize the metals present. The system was then purged of air with nitrogen and the catalyst was reduced by passing hydrogen at a rate of 16 liters per hour through the catalyst for 2 hours, followed by a second nitrogen purge. The oxidation-reduction cycle was repeated, except that the oxidation was conducted for 6 hours and the reduction was conducted for 14 hours. The resulting catalyst contained 14.08 weight percent nickel in the form of its metal, 0.175 weight percent chromium (1.24 percent based on nickel), mostly in the form of its oxide, 0.027 weight percent potassium (0.19 percent based on nickel) partly in the form of its sulfate, 0.29 weight percent sodium (2.06 percent based on nickel) partly in the form of its sulfate, and 0.445 percent of sulfate (3.16 percent based on nickel), in the form of an alkali metal sulfate.

*Example 2*

The catalyst produced as described in Example 1 was employed to dehydrogenate 1,2,3,4-tetrahydronaphthalene-1-one to 1-naphthol. The conditions for the reaction were 375° C. catalyst bed temperature, 10 p.s.i.g. pressure, 278 milliliters of feed per liter of catalyst volume per hour and a 5.6 to 1 mole ratio of hydrogen to feed. The catalyst was reactivated twice during this experiment by employing procedures similar to those described in Example 1 for the initial catalyst activation. The feed composition for each of the three runs, the duration of each run, the yield of 1-naphthol, and the efficiency and degree of conversion of the reaction, based on the 1,2,3,4-tetrahydro-1-naphthol and 1,2,3,4-tetrahydronaphthalene-1-one in the feed are summarized in tabular form below:

| Feed Composition | Run | | |
|---|---|---|---|
| | 1 | 2 | 3 |
| 1,2,3,4-tetrahydronaphthalene-1-one, wt. percent | 63.9 | 49.4 | 47.5 |
| 1-naphthol, wt. percent | 16.0 | 31.5 | 39.8 |
| 1,2,3,4-tetrahydro-1-naphthol, wt. percent | 3.4 | 1.7 | 5.2 |
| Naphthalene, wt. percent | 2.2 | 3.4 | 2.6 |
| Dihydronaphthalene, wt. percent | 1.0 | 0.8 | 0.8 |
| Tetrahydronaphthalene, wt. percent | 1.4 | 5.6 | 2.3 |
| 2-naphthol, wt. percent | 0.7 | 1.3 | 1.3 |
| Catalyst life, hours | 468 | 262 | 173 |
| Percent recovery | | 56 | 37 |
| 1-naphthol: | | | |
| Percent yield (average) | 81.3 | 83.9 | 84.3 |
| Percent efficiency (average) | 95.7 | 98.7 | 98.6 |
| Percent conversion (average) | 84.8 | 85.1 | 85.5 |

*Example 3*

In a manner similar to that described in Example 2, except that the catalyst contained 13 weight percent nickel, 0.225 weight percent chromium (1.73 percent based on nickel), 0.034 weight percent potassium (0.26 percent based on nickel), 0.27 weight percent sodium (2.08 percent based on nickel), and 0.405 percent sulfate (3.11 percent based on nickel), a feed identical to that employed in run 1 of Example 2 was dehydrogenated to produce 1-naphthol. The conditions employed were as follows:

Catalyst bed temperature, ° C. _____ 375
Pressure, p.s.i.g. _____ 10
Feed rate, ml./l./hr. _____ 278
Hydrogen to feed mole ratio _____ 5.6:1

The results are summarized in tabular form below:

| | Run | | |
|---|---|---|---|
| | 1 | 2 | 3 |
| Catalyst life, hours | 508 | 255 | 166 |
| Percent recovery | | 50.2 | 32.7 |
| 1-naphthol: | | | |
| Percent yield (average) | 81.2 | 81.3 | 81.3 |
| Efficiency (average) | 96.0 | 96.3 | 96.2 |
| Conversion (average) | 84.6 | 84.5 | 84.6 |

Example 4

Employing the catalyst described in Example 3, a feed consisting of 63.8 weight percent 1,2,3,4-tetrahydronaphthalene-1-one, 32.7 weight percent 1,2,3,4-tetrahydro-1-naphthol and 0.5 weight percent tetrahydronaphthalene was dehydrogenated under conditions sufficient to convert the 1,2,3,4-tetrahydro-1-naphthol to 1,2,3,4-tetrahydronaphthalene-1-one without under formation of hydrocarbons. The reaction conditions employed are as follows:

Catalyst bed temperature, ° C. _____ 290–380
Pressure, p.s.i.g. _____ 10
Feed rate, ml./l./hr. _____ 464
Hydrogen to feed mole ratio _____ 4.1:1

The results are summarized in tabular form below:

The catalyst employed in the foregoing experiment was then reactivated by passing air through the bed for 54 hours while maintaining a maximum catalyst temperature of 425° C., and then passing hydrogen at a rate of 16 liters per hour through the bed for 19 hours while maintaining a maximum bed temperature of 383° C. After reactivation, the bed was maintained at 290° C. and the 1,2,3,4-tetrahydronaphthalene-1-one - 1,2,3,4-tetrahydro-1-naphthol feed was again passed through the bed. The results of this run are summarized in tabular form below:

| Hours of Operation | Product | | | | Percent Yield | Percent Conversion | Percent Efficiency |
|---|---|---|---|---|---|---|---|
| | 1-naphthol, wt. percent | 1,2,3,4-tetrahydro-naphthalene-1-one, wt. percent | 1,2,3,4-tetrahydro-1-naphthol, wt. percent | Hydrocarbon, wt. percent | | | |
| 916–922 | 44.8 | 46.8 | 1.6 | 3.5 | 46.2 | 50.1 | 92.3 |
| 922–946 | 41.1 | 46.4 | 1.1 | 7.8 | 42.4 | 51.1 | 83.1 |
| 946–969 | 38.8 | 49.2 | 1.6 | 7.1 | 40.0 | 47.7 | 84.1 |
| 969–993 | 36.3 | 52.7 | 1.3 | 5.8 | 37.4 | 44.3 | 84.5 |
| 993–1,017 | 36.2 | 53.0 | 2.1 | 6.3 | 37.3 | 43.2 | 86.4 |
| 1,017–1,031 | 35.6 | 53.9 | 1.1 | 6.5 | 36.7 | 43.3 | 84.8 |
| 1,031–1,055 | 35.8 | 53.8 | 1.3 | 6.4 | 36.9 | 43.2 | 85.5 |
| 1,055–1,079 | 33.0 | 56.3 | 1.0 | 6.1 | 34.6 | 40.9 | 83.2 |
| 1,079–1,103 | 32.0 | 57.0 | 1.4 | 6.1 | 38.2 | 44.9 | 85.3 |
| Average | 37.1 | 52.1 | 1.4 | 6.1 | 38.2 | 44.9 | 85.3 |

Example 5

Employing apparatus and procedures similar to those described in Example 4, a 1,2,3,4-tetrahydronaphthalene-1-one-1,2,3,4-tetrahydro-1-naphthol mixture was dehydrogenated in contact with a catalyst produced in accordance with this invention. A second run was conducted under substantially the same conditions, except that the catalyst contained about 30 weight percent copper, based on the

| Hours of Operation | Temperature, ° C. | Product | | | | Percent Yield | Percent Conversion | Percent Efficiency |
|---|---|---|---|---|---|---|---|---|
| | | 1-naphthol, wt. percent | 1,2,3,4-tetrahydronaphthalene-1-one, wt. percent | 1,2,3,4-tetrahydro-1-naphthol, wt. percent | Hydrocarbon, wt. percent | | | |
| 0–238 | 290 | 31.2 | 53.0 | 2.8 | 9.8 | 32.4 | 42.2 | 76.7 |
| 238–261 | 300 | 27.4 | 54.5 | 5.6 | 8.1 | 28.4 | 37.8 | 77.0 |
| 261–382 | 310 | 30.6 | 53.0 | 4.3 | 7.8 | 31.7 | 40.6 | 78.1 |
| 382–430 | 320 | 32.8 | 52.2 | 4.7 | 5.7 | 34.0 | 41.1 | 82.9 |
| 430–525 | 330 | 35.7 | 49.4 | 5.0 | 5.1 | 37.0 | 43.6 | 84.8 |
| 525–621 | 340 | 38.9 | 45.1 | 4.6 | 6.6 | 40.3 | 48.4 | 83.3 |
| 621–789* | 350 | 44.5 | 41.8 | 5.6 | 3.9 | 45.9 | 51.1 | 89.7 |
| 789–837 | 360 | 45.2 | 39.7 | 6.3 | 5.0 | 46.6 | 52.3 | 89.2 |
| 837–885 | 370 | 46.5 | 36.5 | 6.4 | 6.8 | 47.0 | 55.9 | 86.0 |
| 885–916 | 380 | 48.0 | 33.8 | 7.3 | 6.7 | 49.5 | 57.6 | 85.9 |
| Average | | 37.1 | 47.3 | 4.7 | 6.8 | 38.4 | 46.3 | 83.0 |

*Feed changed to 59.0 percent 1,2,3,4-tetrahydronaphthalene-1-one, 38.0 weight percent 1,2,3,4-tetrahydro-1-naphthol and 1.3 weight percent tetrahydronaphthalene after 629 hours of operation.

nickel. The results and operating conditions for these two runs are set forth in tabular form below:

|  | Run 1 | Run 2 |
|---|---|---|
| Catalyst—Component, wt. percent based on Nickel: | | |
| Ni | 100 | 100 |
| Cu | | 30 |
| Cr | 1.62 | 1.24 |
| Alakli metals (K+Na) | 1.95 | 1.96 |
| $SO_4$ | 2.76 | 3.11 |
| Feed Composition, wt. percent: | | |
| 1,2,3,4-tetrahydro-1-naphthol | 39.0 | 32.1 |
| 1,2,3,4-tetrahydronaphthalene-1-one | 59.3 | 63.5 |
| Naphthalene | 0.7 | |
| 1,2,3,4-tetrahydronaphthalene | 0.7 | 1.1 |
| Dihydronaphthalene | | 0.2 |
| Process Conditions: | | |
| Time, hours | 380 | 381 |
| Feed rate, parts/hr | 19.1 | 13.7 |
| Product—Component, wt. percent: | | |
| 1-naphthol | 42.0 | 16.7 |
| 1,2,3,4-tetrahydro-1-naphthol | 2.3 | 2.2 |
| 1,2,3,4-tetrahydronaphthalene-1-one | 44.3 | 65.1 |
| 2-naphthol | 1.3 | 0.7 |
| Naphthalene | 3.3 | 5.0 |
| 1,2,3,4-tetrahydronaphthalene | 2.4 | 8.8 |
| Dihydronaphthalene | 1.0 | 0.9 |
| Percent Yield | 42.7 | 17.5 |
| Percent Conversion | 52.4 | 29.6 |
| Percent Efficiency | 81.5 | 59.0 |

From the above data it is clear that the copperless catalyst of this invention is superior to a similar catalyst containing copper. At a feed rate over 45 percent in excess of the rate employed with the copper-containing catalyst the catalyst of this invention permitted a 144 percent increase in yield of 1-naphthol, a 77 percent increase in conversion of 1,2,3,4-tetrahydro-1-naphthol and 1,2,3,4-tetrahydronaphthalene-1-one to naphthol and a 38 percent increase in efficiency of the process.

In addition, it has been found that, in the first stage of the dehydrogenation process, when the copper-containing catalyst is employed, the conversion of 1,2,3,4-tetrahydro-1-naphthol and 1,2,3,4-tetrahydronaphthalene-1-one to 1-naphthol decreases when conditions are maintained to limit the dehydration of 1,2,3,4-tetrahydro-1-naphthol to dihydronaphthalene to less than 10 percent of the 1,2,3,4-tetrahydro-1-naphthol. On the other hand, the degree of conversion increases while maintaining the 1,2,3,4-tetrahydro-1-naphthol loss to less than 7 percent, thus increasing the overall yield of naphthol and the efficiency of the entire system.

What is claimed is:

1. A catalyst consisting essentially of an admixture of nickel and, based on the weight of said nickel, from 0.5 to 4 weight percent chromium, substantially in the form of its oxide, from 1 to 3 weight percent of an alkali metal selected from the group consisting of sodium, potassium and mixtures thereof, a portion of said alkali metal being in the form of a sulfate of said alkali metal, the sulfur of said sulfate being present in a ratio from 1.2 to 8 based on the mole ratio of said alkali metal to said sulfur.

2. A catalyst consisting essentially of an admixture of nickel and, based on the weight of said nickel, from 1 to 2 weight percent chromium, substantially in the form of its oxide, from 1 to 3 weight percent sodium, a portion of which is in the form of its sulfate, from 0 to 0.4 weight percent potassium, a portion of which is in the form of its sulfate salt, the sulfur of said sulfate being present in a ratio from 2 to 4 based on the mole ratio of said sodium and said potassium to said sulfur.

3. In a process for the catalytic dehydrogenation of a member selected from the group consisting of 1,2,3,4-tetrahydronaphthalene-1-one, 1,2,3,4-tetrahydro-1-naphthol, and mixtures thereof to form 1-naphthol, the improvement of conducting said dehydrogenation in contact with a catalyst consisting essentially of an admixture of nickel and, based on the weight of said nickel, from 0.5 to 4 percent chromium, substantially in the form of its oxide, from 1 to 3 weight percent of an alkali metal selected from the group consisting of sodium, potassium and mixtures thereof, a portion of said alkali metal being in the form of a sulfate of said alkali metal, the sulfur of said sulfate being present in a ratio from 1.2 to 8 based on the mole ratio of said alkali metal to said sulfur.

4. In a process for the catalytic dehydrogenation of a member selected from the group consisting of 1,2,3,4-tetrahydronaphthalene-1-one, 1,2,3,4-tetrahydro-1-naphthol, and mixtures thereof to form 1-naphthol, the improvement of conducting said dehydrogenation in contact with a catalyst consisting essentially of an admixture of nickel, and based on the weight of said nickel, from 1 to 2 weight percent chromium substantially in the form of its oxide, from 1 to 3 weight percent sodium a portion of which is in the form of its sulfate, from 0 to 0.04 weight percent potassium, a portion of which is in the form of its sulfate salt, the sulfur of said sulfate being present in a ratio of 2 to 4 based on the mole ratio of said sodium and said potassium to said sulfur.

References Cited
UNITED STATES PATENTS 2,588,359   3/1952   Chitwood et al. ___ 260—621 X
3,117,939   1/1964   Royce _____ 252—470 X LEON ZITVER, *Primary Examiner.*

D. M. HELFER, H. ROBERTS, *Assistant Examiners.*